(No Model.)

J. F. HUNT & F. A. RAPPLEYE.
FRUIT BOX.

No. 420,157. Patented Jan. 28, 1890.

Witnesses:
C. G. Crannell
A. H. LaCasse

Inventors:
Julius F. Hunt,
Frank A. Rappleye,
By Geo. B. Selden,
Atty.

UNITED STATES PATENT OFFICE.

JULIUS F. HUNT, OF ROMULUS, AND FRANK A. RAPPLEYE, OF FARMER VILLAGE, ASSIGNORS OF THREE-FOURTHS TO HARLAN P. VAN DUSEN, OF NEWARK, NEW YORK.

FRUIT-BOX.

SPECIFICATION forming part of Letters Patent No. 420,157, dated January 28, 1890.

Application filed November 11, 1889. Serial No. 329,915. (No model.)

*To all whom it may concern:*

Be it known that we, JULIUS F. HUNT, of Romulus, New York, and FRANK A. RAPPLEYE, of Farmer Village, New York, citizens of the United States, have jointly invented certain Improvements in Fruit-Boxes, of which the following is a specification, reference being had to the accompanying drawings.

Our invention relates to certain improvements in fruit-boxes, which improvements are fully described and illustrated in the following specification and the accompanying drawings, and the novel features thereof specified in the claims annexed to the said specification.

Our improvement in fruit-boxes is represented in the accompanying drawings, in which—

Figure 1:
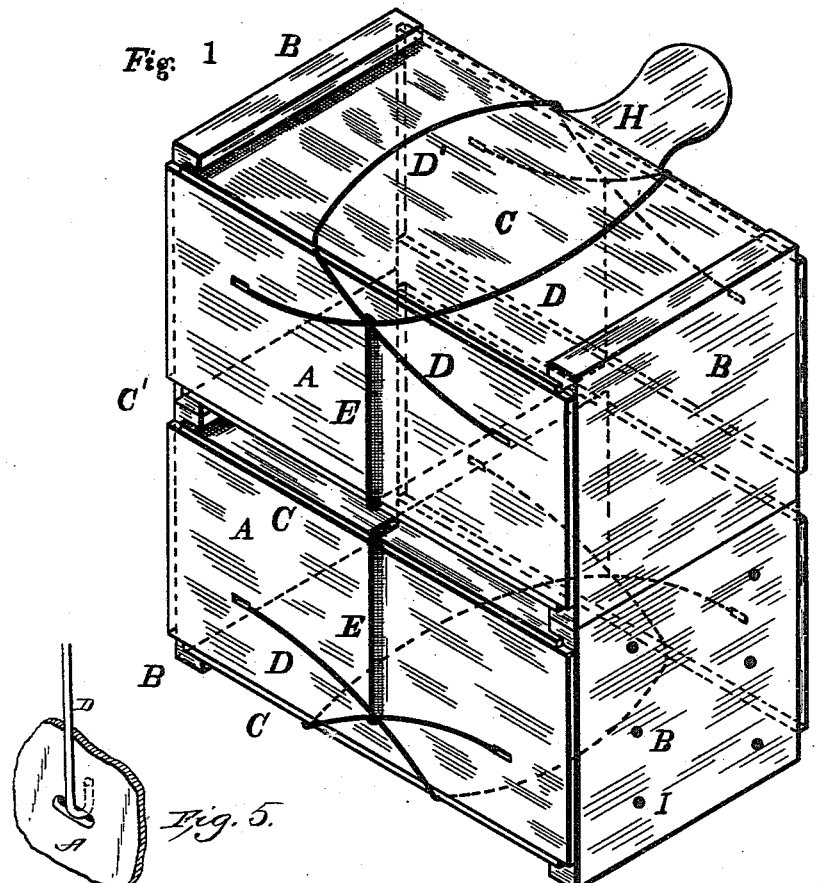
Figure 2:
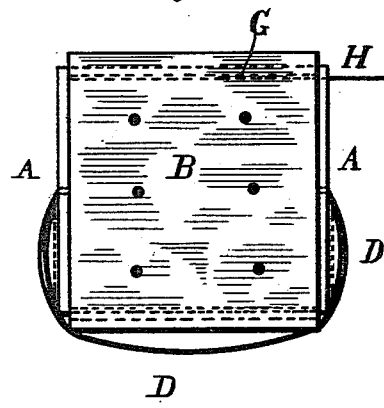
Figure 3:
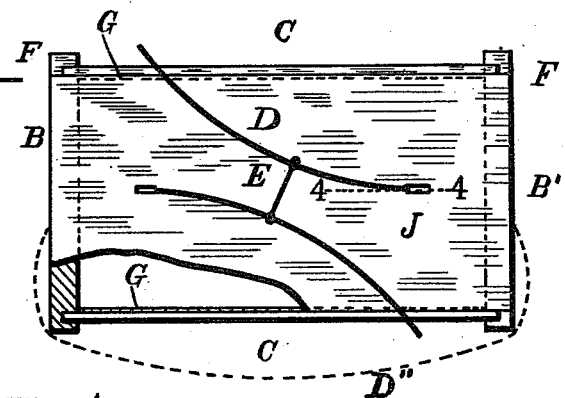
Figure 4:
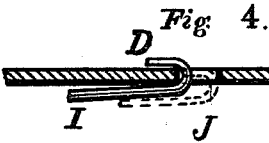

Figure 1 is a perspective view showing two of our improved fruit-boxes placed one above the other. Fig. 2 is an end view. Fig. 3 is a side elevation. Fig. 4 is a section on the line 4 4, Fig. 3; and Fig. 5 is a detail showing the operative position of the bail-hooks.

Our improved fruit-box consists of the sides A A', the ends B B', the sliding covers C C', the bails D D', and connecting-wire E, although certain of the inventions herein specified are applicable to boxes having only a single cover or a single bail. The ends B B' of the box are made heavier than the sides, so that the nails used to secure the sides to the ends will hold firmly, and also so that grooves F F' may be cut in the inner surfaces of the ends where they project beyond the sides, to receive the sliding cover or covers C C'. The grooves may, however, be formed in other ways. The two covers C C' enable us to produce a double-faced box, which permits of the inspection of the fruit contained in the box from either the upper or lower side—an advantage to the purchaser which prevents the common practice of putting the best fruit at the top of the package.

In order to provide for a suitable degree of compression of the fruit in the box, and to facilitate the insertion of the sliding covers, we place inside the cover the compressor-plate G, which may be either left in the box or removed therefrom by sliding it laterally at the time the cover is inserted, the fruit being inclosed in paper, which is folded down over it, so as to prevent its being injured by the edge of the cover. The compressor-plate may also be removed after the insertion of the cover, being made thin, as of sheet-steel, so that it can be taken out between the cover and the side of the box, being provided, if desired, with a projecting handle or hand-piece, as H, Fig. 2, to enable the packer to withdraw the compressor.

We provide our improved fruit-box with one or more bails or handles D D', which, when folded over the box, serve to hold one or both of the covers in place, and which also act as a spring to support the fruit-box in an elastic manner to prevent injury to the fruit during transportation. These springs or bails preferably extend along one or more sides of the box and stand outwardly therefrom, and when they pass over the edge of a cover or covers are adapted to hold them in place. As indicated in the drawings, the bail or bails D D' are bent away from the cover, so as to form a spring, which holds the box a short distance above the bottom of the crate or other support on which the box is placed for shipment. As indicated in Fig. 1, a series of boxes may be placed one above the other, the spring-bails on the lower box being turned downward, so as to sustain the weight in all the boxes in any one vertical row, in which case the bails used on the upper boxes need not be formed so as to constitute springs. The bails may also spring outward laterally from the sides of the box, as represented most clearly in Fig. 2, to afford protection against lateral shocks. The bails are bent at their ends to form the hooks I, which are inserted into the slotted openings J in the sides of the box, which openings are arranged transversely or at an angle to the normal position of the bail to prevent the disengagement of the hooks, except in case the hooks may be held in place by a binding or clamping wire. By this device we are enabled to apply the bails to the box after it has been filled with fruit and the cover or covers applied, and still to prevent the accidental detachment of the bails therefrom. The manner of inserting the hooks in the openings will be understood from the sectional view, Fig. 4, the inner end of the hook extending along the interior surface of the side of the box a short distance in the same direction in which the bail extends.

In order to secure the bails and covers in place and to prevent the cover or sides from springing or bulging outward, we connect them together by the wire or hook E, the ends of which are twisted together, so as to secure the bails to each other, and so as to draw the bails firmly down upon the cover or covers. There are two ways in which the connection can be made, in one of which, as shown in Fig. 1, the bails are both turned over the same cover, and in the other one of the bails is turned over the cover on the top of the box and the other over the cover at the bottom of the box. In either case the bails are connected together by the twisted wire E; but in this arrangement (shown in Fig. 1) the wire passes around the box from one side to the other and holds the bottom or cover from springing. There is also another way in which the connecting-wire can be used, being in this case fastened to one of the bails only. In either case the connecting-wire aids in binding a cover, whether it actually extends around said cover or connects the first-named spring or bail to a second one, which engages said cover. It will also be understood that the bail or bails may be inserted in the ends of the box and used with or without the connecting-wire for the purposes of affording a spring-support to the box and of serving as a handle or handles.

We provide a series of ventilating-openings in the opposite walls of our improved fruit-box, as indicated at I, for the purpose of preventing the sweating or molding of the fruit during transportation. These openings may be of any size or number, and some of them may be used to insert the ends of the bails in. It will also be understood that the spring-bail may extend from end to end of the box, as represented at D'', Fig. 3.

Our improved fruit-box is cheap and durable, and the spring-support provided by the bails preserves the fruit shipped in it in better condition during long journeys than in any other box with which we are acquainted. The double-faced feature is also an important advantage to the shipper, dealer, and consumer.

We claim—

1. The combination, with a fruit-package, of a supporting-spring formed of a strip of spring metal or wire extending along and outward from one of the sides of the package and having its ends fastened to the opposing adjacent walls, whereby an elastic support is afforded the package and its contents during transportation, substantially as described.

2. The combination, with a fruit-box consisting of two opposite sides and ends and provided with a removable cover, of a supporting-spring formed of a strip of spring material extending along and outward from one of the faces of the box and engaging the free edges of the cover, and having its ends fastened to the box, substantially as described.

3. The combination, with the herein-described fruit-box provided with the sliding covers arranged to permit the inspection of fruit from opposite sides, of a supporting-spring extending along and outward from one of the sides of the box, and clamped by a binder which constitutes a tension device and extends around the box, whereby both covers are held, substantially as described.

4. The combination, with a fruit-box, of two supporting-springs, each extending around an opposite side of said box and over its edges, the springs being clamped or tied together to put them under tension, substantially as described.

5. The combination, with a fruit-package designed to be used for the transportation of fruit, of a bail or spring provided with bent ends forming hooks, the package being provided with slots arranged at an angle to the normal position of the bail, through which the hooks may be inserted, and the bail then turned to its operative position to engage the edges of the slots, substantially as described.

6. The combination, with a box consisting of the sides A A', ends B B', projecting beyond the sides and provided with grooves on the inner surfaces of their projecting edges, and the sliding covers C C', arranged to slide in the said grooves, of the spring-bails D D', attached to the opposite sides of the box and extending over and outward from the cover or covers, and the connecting-wire E, arranged to secure the bail or bails in place, substantially as described.

7. The combination, with a fruit-box provided with a sliding cover, of the compressor-plate G, of dimensions shorter than the cover and located inside thereof and between it and the fruit, and having an extension or handle which extends through a space between said cover and the side of the box, whereby it may be withdrawn, substantially as described.

JULIUS F. HUNT.
FRANK A. RAPPLEYE.

Witnesses:
D. C. WHEELER,
J. B. PETERSON.